US012052560B2

(12) United States Patent
Crawford

(10) Patent No.: US 12,052,560 B2
(45) Date of Patent: Jul. 30, 2024

(54) TECHNIQUES FOR SELECTING AN AUDIO PROFILE FOR A USER

(71) Applicant: HARMAN INTERNATIONAL INDUSTRIES, INCORPORATED, Stamford, CT (US)

(72) Inventor: Steven Edmond Crawford, San Antonio, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 155 days.

(21) Appl. No.: 17/825,392

(22) Filed: May 26, 2022

(65) Prior Publication Data

US 2023/0388731 A1 Nov. 30, 2023

(51) Int. Cl.
*H04S 7/00* (2006.01)

(52) U.S. Cl.
CPC ........... *H04S 7/302* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 5,742,689 | A | 4/1998 | Tucker et al. | |
| 2018/0310115 | A1 | 10/2018 | Romigh | |
| 2019/0045317 | A1 * | 2/2019 | Badhwar | H04S 7/302 |
| 2021/0306793 | A1 * | 9/2021 | Kumehara | H04S 7/304 |
| 2023/0222799 | A1 * | 7/2023 | Chang | G06F 16/634 381/56 |

FOREIGN PATENT DOCUMENTS

| | | | |
|---|---|---|---|
| JP | 6018485 | B2 | 11/2016 |

* cited by examiner

*Primary Examiner* — Qin Zhu
(74) *Attorney, Agent, or Firm* — Artegis Law Group, LLP

(57) ABSTRACT

Techniques for selecting an audio profile for an audio output device include generating a plurality of vector representations, wherein each vector representation of the plurality of vector representations is based on a candidate audio profile of a plurality of candidate audio profiles; clustering the plurality of vector representations into a plurality of clusters; selecting a first candidate audio profile that is representative of the plurality of candidate audio profiles included in a first cluster of the plurality of clusters; presenting, to a user, a plurality of audio test patterns, wherein each audio test pattern is rendered based on the first candidate audio profile; receiving, from the user, at least one response based on the plurality of audio test patterns; and determining an audio profile for an audio output device based on the at least one response of the user.

20 Claims, 6 Drawing Sheets

TECHNIQUES FOR SELECTING AN AUDIO PROFILE FOR A USER

BACKGROUND

Field of the Various Embodiments

The various embodiments relate generally to audio output devices and, more specifically, to selecting an audio profile for a user.

Description of the Related Art

Audio output devices, such as headphones and speakers, generate sound as combinations of frequencies within at least a human-audible frequency range. In some cases, an audio output device generates spatial audio that a user of the audio output device perceives as originating from a particular location relative to the head of the user within a multidimensional space, such as locations within a three-dimensional sphere surrounding the head of the user. That is, rather than perceiving sounds that originate from a left-ear headphone speaker or a right-ear headphone speaker, a user can perceive sounds as originating in front of, behind, above, below, or at any angle relative to the head of the user. In extended reality environments (e.g., virtual reality environments, augmented reality environments, or the like), a display device can display a visual indicator of a particular location within the multidimensional space while the audio output device generates audio that is to be perceived as originating at the same location as the visual indicator. For example, while a display within a helmet shows a speaking avatar at a location within the extended reality environment, the audio output device can render speech that corresponds to the speaking avatar and can present the rendered speech as if it originates from the location of the speaking avatar.

One challenge with spatial audio is that the perceived locations of the audio are affected by the shapes of the ears of each user, such as the ridges and folds of the pinna of the left ear and right ear of each user. As a result, a first user might perceive a sound generated by an audio output device as originating from a first location within the multidimensional space, but a second user of the audio output device might perceive the same sound as originating from a second, different location within the multidimensional space. Further, the ridges and folds of the pinna of each ear can differently affect the perception of sounds at different frequencies. As a result, the perception of spatial audio by a user can vary based on different frequencies. For example, when the audio output device generates two sounds (such as a low-frequency sound and a high-frequency sound) to be perceived as originating at a first location, the user might perceive the first sound as originating from the first location but might perceive the second sound as originating from a second, different location. The varied perception of spatial audio can undesirably reduce the effectiveness of spatial audio, such as where a user perceives speech as originating from a location other than an intended location for the spatial audio.

In view of the varied perception of spatial audio, an audio output device can be configured to generate spatial audio according to a specific audio profile, such as a head-related impulse response (HRIR), which adjusts the spatial audio so that a user perceives the locations of the origin of sounds that correspond to the intended locations of the origins of the sounds within extended reality environments. For example, an audio output device can perform a calibration process in which a set of sounds are generated within the multidimensional space, and a user interface can ask the user to indicate the location at which the user perceives each sound to originate. Based on the input of the user through the user interface, the audio output device can incrementally model the audio profile of the user and can adjust the parameters used to generate sound according to the audio profile, until the locations at which the generated sounds are intended to originate match the locations perceived by the user. However, the details of the audio profile and the range of possible parameters involved in generating spatial audio can be large. The large search space of possible audio profiles and spatial audio parameters can cause the calibration process to be lengthy, which can be time-consuming or tiresome for the user. If the user does not complete the calibration process, or if the calibration process is unable to determine an acceptable set of spatial audio parameters within a reasonable amount of time, the audio output device can remain poorly calibrated, resulting in inaccurate or ineffective spatial audio generated by the audio output device.

As another example, an audio output device can have access to a plurality of audio profiles, each corresponding to a different set of parameters that the audio output device could use to generate spatial audio. A first user might experience a more accurate localization of sound generated by an audio output device based on a first audio profile, and a second user might experience a more accurate localization of sound generated by an audio output device based on a second audio profile. Therefore, one option is to present each user with a plurality of audio profiles and to allow the user to select and test each audio profile. Each user could therefore be allowed to choose one of the audio profiles that the user perceives to result in the most accurate rendering of spatial audio for a particular audio device. However, the number of possible audio profiles that could be preferred by different users can be large. Presenting a large number of audio profiles to a user can also be time-consuming or tiresome for the user. If the user does not review all of the available audio profiles, or if the user is unable to determine any of the audio profiles that the user perceives as generating spatial audio that matches the intended locations of the sounds, the audio output device can remain poorly calibrated, resulting in inaccurate or ineffective spatial audio generated by the audio output device.

As the foregoing illustrates, what is needed are more effective techniques for selecting an audio profile for a user.

SUMMARY

In various embodiments, a computer-implemented method of selecting an audio profile for an audio output device include generating a plurality of vector representations, wherein each vector representation of the plurality of vector representations is based on a candidate audio profile of a plurality of candidate audio profiles; clustering the plurality of vector representations into a plurality of clusters; selecting a first candidate audio profile that is representative of the plurality of candidate audio profiles included in a first cluster of the plurality of clusters; presenting, to a user, a plurality of audio test patterns, wherein each audio test pattern is rendered based on the first candidate audio profile; receiving, from the user, at least one response based on the plurality of audio test patterns; and determining an audio profile for an audio output device based on the at least one response of the user.

Further embodiments provide, among other things, a system and a non-transitory computer-readable medium configured to implement the method set forth above.

At least one technical advantage of the disclosed techniques relative to the prior art is that, with the disclosed techniques, a user can be quickly and effectively guided through the process of selecting an effective audio profile usable by an audio output device to generate spatial audio for the user. The disclosed techniques further increase the likelihood that the user will select an effective audio profile so that an audio output device is able to generate improved spatial audio over spatial audio using audio profiles selected by other techniques. The disclosed techniques also reduce the computing resources needed to select candidate audio profiles from a potentially large number of audio profiles while also improving the likelihood that a candidate profile will be effective for and compatible with the user. The ability to select better candidate profiles reduces the number of candidate profiles that have to be considered during the audio profile selection process, which further reduces the time spent selecting an audio profile and the computing resources used to select the audio profile. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts can be practiced without one or more of these specific details.

Figure 1:
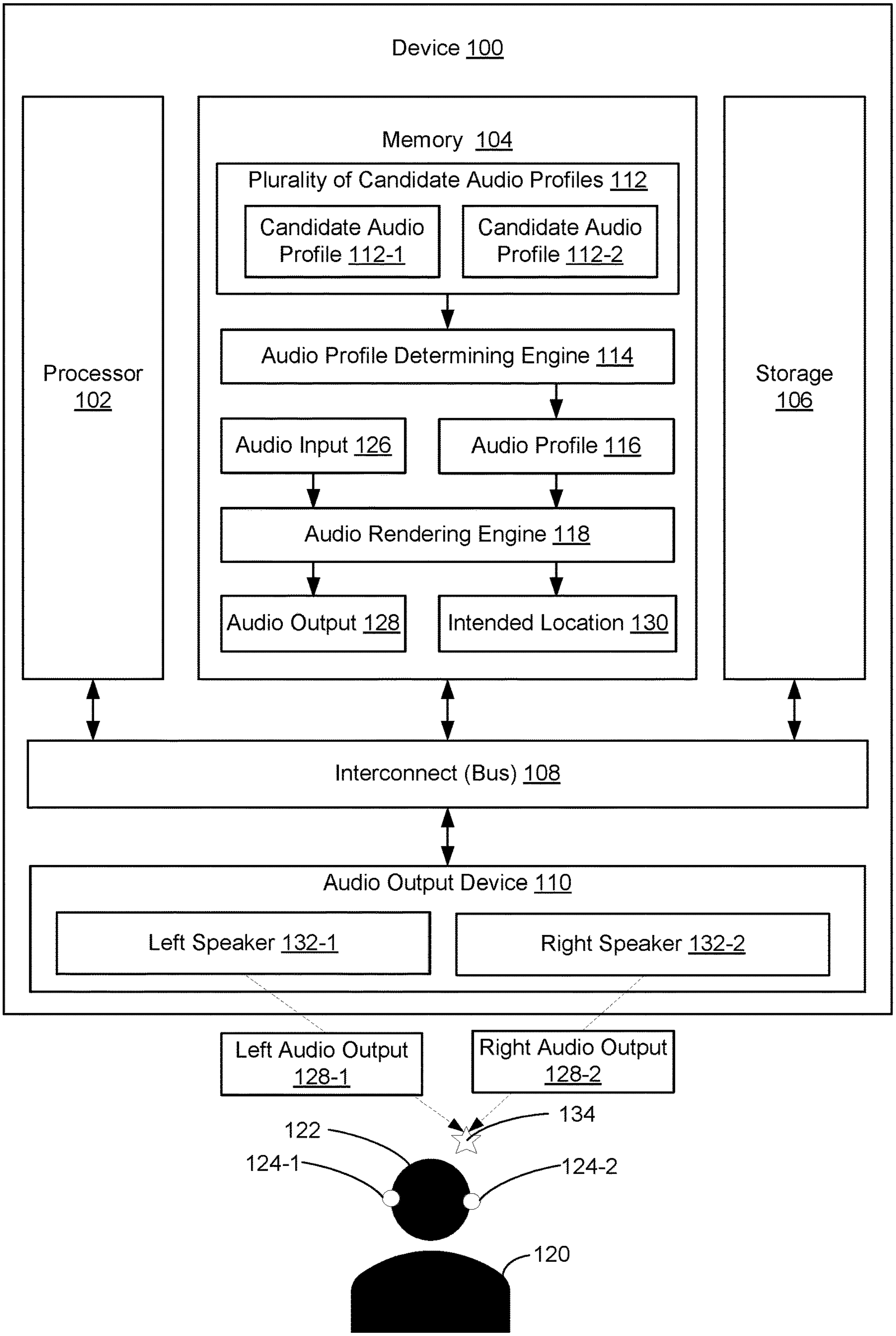
FIG. 1 illustrates a device configured according to various embodiments.

FIG. 1 illustrates a device 100 configured according to various embodiments. Device 100 can be an audio output device such as a pair of headphones, a speaker system, or a home theater audio system. Device 100 can also be a desktop computer, a laptop computer, a smartphone, a personal digital assistant (PDA), a tablet computer, or any other type of computing device suitable for practicing one or more aspects of the various embodiments. It is noted that the computing device described herein is illustrative and that any other technically feasible configurations fall within the scope of the various embodiments. As shown, the device 100 includes, without limitation, a processor 102, memory 104, storage 106, an interconnect bus 108, and an audio output device 110. The memory 104 includes, without limitation, a plurality of candidate audio profiles 112, an audio profile determining engine 114, and an audio rendering engine 118. The audio output device 110 includes a left speaker 132-1 and a right speaker 132-2.

The processor 102 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, the processor 102 can be any technically feasible hardware unit capable of processing data and/or executing software applications.

Memory 104 can include a random-access memory (RAM) module, a flash memory unit, or any other type of memory unit or combination thereof. The processor 102 is configured to read data from and write data to memory 104. Memory 104 includes various software programs (e.g., an operating system, one or more applications) that can be executed by the processor 102 and application data associated with the software programs. Storage 106 can include non-volatile storage for applications and data and can include fixed or removable disk drives, flash memory devices, and CD-ROM, DVD-ROM, Blu-Ray, HD-DVD, or other magnetic, optical, or solid-state storage devices. The interconnect bus 108 connects the processor 102, the memory 104, the storage 106, the audio output device 110, and any other components of the device 100.

As shown, the memory 104 stores a plurality of candidate audio profiles 112 that can be used to configure the audio output device 110 to output audio. Each of the candidate audio profiles 112, such as a first candidate audio profile 112-1 and a second candidate audio profile 112-2, can include a head-related impulse response (HRIR). In various embodiments, the HRIR included in a candidate audio profile 112 is a function that indicates how a particular user 120 would perceive an audio impulse, such as a brief audio cue. The HRIR can also be used to transform an audio signal that is to be output by the audio output device 110. Alternatively or additionally, each of the candidate audio profiles 112 can include a head-related transfer function (HRTF). In various embodiments, the HRTF included in a candidate audio profile 112 is a function that indicates how the head of a particular user 120 would transform various frequencies of an audio sample, such as tones of various frequencies or a combination thereof. The HRTF can be used to transform various audio frequencies of an audio signal that is to be output by the audio output device 110. The HRIR can be a time-domain representation of the HRTF. Also, the head-related transfer function can be a frequency-domain representation of the head-related impulse function. In various embodiments, the head-related transfer function can be determined by applying a Fourier transform to the head-related impulse function.

In many cases, the device 100 is configured to generate an audio output 128 to be perceived by a user 120. More particularly, the audio output device 110 is configured to generate spatial audio that the user 120 perceives at an intended location 130 around a head 122 of the user 120, such as at a particular horizontal angle, vertical angle, and distance with respect to a forward direction of the head 122 of the user 120. However, spatial audio can be difficult to generate in a manner that the user 120 perceives at the intended location 130 due to the physical properties of the ears 124 of the user 120. For example, due to the shapes and sizes of the pinna of the left ear 124-1 and right ear 124-2, a user 120 can perceive the audio output 128 at a location 134 that matches the intended location 130 of the audio output 128. However, a different user, whose left ear 124-1 and right ear 124-2 include pinna of different shapes and sizes, could perceive the same audio output 128 at a different location 134 that is unclear, or that does not match the intended location 130 of the audio output 128. Thus, the spatial audio can vary in clarity and/or effectiveness for different users 120. The device 100 selects an audio profile 116 from among the candidate audio profiles 112 that, when applied to transform audio output 128 that is output by the audio output device 110, produces clearer and/or more effective spatial audio for the user 120.

As shown, the audio profile determining engine 114 is a program stored in the memory 104 and executed by the processor 102 to determine an audio profile 116 for the audio output device 110. The audio profile determining engine 114 determines the audio profile 116 based on the techniques disclosed herein. For example, the audio profile determining engine 114 generates a vector representation of each candidate audio profile 112-1, 112-2 of the plurality of candidate audio profiles 112. Each vector representation can be, for example, a vector representation that aggregates two or more left ear measurements and two or more right ear measurements of a candidate audio profile, resulting in a compact representation of the candidate audio profile 112. The audio profile determining engine 114 can also cluster the vector representations into a plurality of clusters. Each cluster of the plurality of clusters can represent a group of similar candidate audio profiles 112, such as candidate audio profiles 112 generated by and/or for users 120 who have similarly shaped left ears 124-1 and right ears 124-2, and who therefore perceive spatial audio in a similar manner. The audio profile determining engine 114 presents, to the user 120, two or more audio test patterns, wherein each audio test pattern is associated with one cluster of the plurality of clusters. In various embodiments, the audio profile determining engine 114 presents the audio test patterns to the user 120 in a selection process involving the user, which includes gamification elements. In various embodiments, the selection process includes, using each of one or more audio profiles, generating audio that the user should perceive as originating at an intended location 130, and receiving user input based on the generated audio to determine whether the user perceives the audio as originating at the intended location 130. Based on at least one response from the user to the two or more audio test patterns, the audio profile determining engine 114 determines an audio profile 116 for generating audio output 128 through the audio output device 110. Further detail about these features of the audio profile determining engine 114 is provided below.

As shown, the audio rendering engine 118 is a program stored in the memory 104 and executed by the processor 102 to generate audio output 128 for output by the audio output device 110. In various embodiments, the audio rendering engine 118 receives the audio profile 116 determined by the audio profile determining engine 114. The audio rendering engine 118 also receives an audio input 126. The audio input 126 can be, for example, an audio sample generated by the processor 102, retrieved from the memory 104 or storage 106, and/or received from an outside source, such as another device or a wireless signal. The audio rendering engine 118 transforms the audio input 126 using the audio profile 116 to generate an audio output 128 for output by the audio output device 110. In particular, the audio rendering engine 118 generates the audio output 128 to be perceived by the user 120 at an intended location 130. The audio rendering engine 118 can transmit the audio output 128 to the audio output device 110 by the interconnect bus 108.

As shown, the audio output device 110 includes a left speaker 132-1 and a right speaker 132-2. The left speaker 132-1 generates a left audio output 128-1, and the right speaker 132-2 generates a right audio output 128-2. The combination of the left audio output of the left speaker 132-1 and the right audio output of the right speaker 132-2 causes the user 120 to perceive the audio output 128 at a location 134 relative to a forward direction of the head 122 of the user 120. Due to the selection of the audio profile 116, the location 134 of the audio output 128 perceived by the user 120 matches the intended location 130 of the audio output 128.

The embodiments of FIG. 1 are merely examples and other configurations and arrangements of device 100 or similar devices are possible. In some embodiments, the set of candidate audio profiles 112 (e.g., the set of HRIRs and/or HRTFs) can be stored external to device 100, such as in a remote server (e.g., a cloud server or the like), a remote database, and/or the like. A device, such as device 100, can access the remote server or database via a wide-area network (e.g., the Internet or the like) and/or a local area network (e.g., a wireless LAN or the like). In order to select an audio profile 116 for an audio output device 110, the device can retrieve one or more candidate audio profiles 112 from the remote server or database and evaluate the retrieved one or more candidate audio profiles 112 according to the techniques presented herein.

Figure 2:
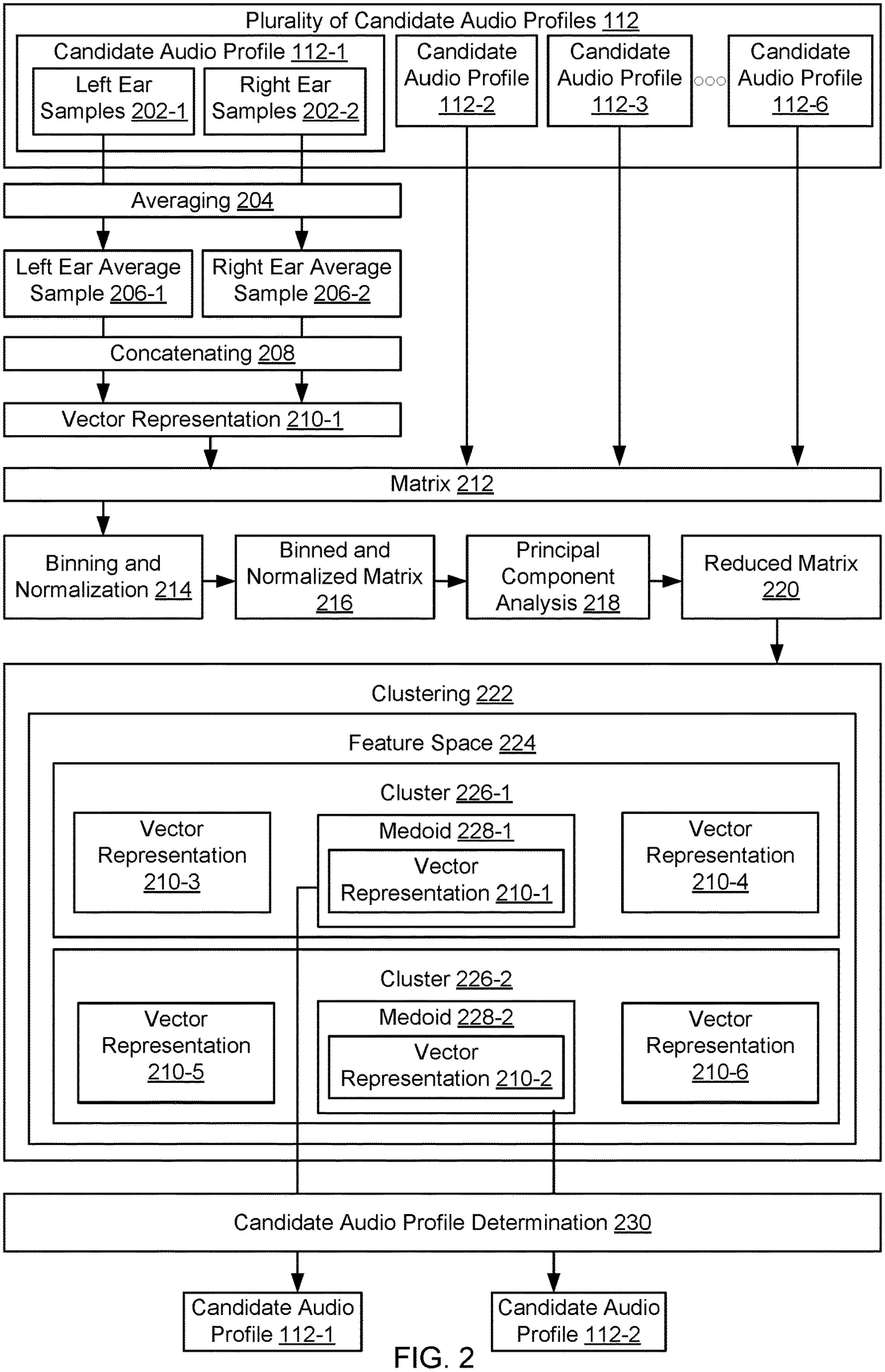
FIG. 2 is an illustration of selecting candidate audio profiles by the device of FIG. 1, according to various embodiments.

FIG. 2 is an illustration of selecting candidate audio profiles by the device of FIG. 1, according to various embodiments. In various embodiments, the clustering is performed by the audio profile determining engine 114 of FIG. 1.

As shown, a plurality of candidate audio profiles 112 includes a first candidate audio profile 112-1, a second candidate audio profile 112-2, a third candidate audio profile 112-3, and so on, up to and including a sixth candidate audio profile 112-6. Although FIG. 2 shows six candidate audio profiles 112, the plurality of candidate audio profiles 112 could include any number of candidate audio profiles 112, such as hundreds or thousands of candidate audio profiles 112. In various embodiments, each candidate audio profile 112 includes one or more left ear samples 202-1 (e.g., recordings of properties of audio received by a left ear of a user 120 in response to an audio cue, such as a brief tone, such as by a microphone placed in or near a left ear canal of the user 120) and/or one or more right ear samples 202-2 (e.g., recordings of properties of audio received by a right ear of the user 120, such as by a microphone placed in or near a right ear canal of the user 120). In various embodiments, the left ear samples 202-1 and the right ear samples 202-2 are based on recordings of audio cues of different frequencies or frequency combinations, volume levels, locations in space relative to the head 122 of the user 120, and/or ambient conditions. Collectively, the left ear samples 202-1 and the right ear samples 202-2 can comprise a head-related impulse function (HRIR). Each HRIR is a function that indicates how the head 122 and ears 124 of a user 120 modify the audio from an audio impulse before the audio is perceived by the user 120, and therefore how the head 122 and ears 124 of the user 120 transform audio output 128 generated by the device 100. Using the HRIR to render audio allows the audio output device to control the location 134 at which the user 120 would perceive the audio output 128. Alternatively or additionally, collectively, the left ear samples 202-1 and the right ear samples 202-2 can comprise a head-related transfer function (HRTF). Each HRTF is a function that indicates how the head 122 and ears 124 of a user 120 modify various audio frequencies before the audio is perceived by the user 120, and therefore how the head 122 and ears 124 of the user 120 transform audio output 128 of various frequencies generated by the device 100. Using the HRTF to render audio allows the audio output device to control the location 134 at which the user 120 would perceive the audio output 128. Each candidate audio profile 112 can correspond to and/or be based on one or more users 120 having a left ear 124-1 and/or a right ear 124-2 of a particular shape or size, wherein users 120 having ears 124 of similar shapes and sizes are likely to perceive audio output 128 rendered using a same candidate audio profile 112 as having originated from a similar location 134.

The audio profile determining engine 114 generates a vector representation 210 of one or more of the candidate audio profiles 112. As shown, the audio profile determining engine 114 performs an averaging 204 of the left ear samples 202-1 of the first candidate audio profile 112-1 to generate a left ear average sample 206-1, and also an averaging 204 of the right ear samples 202-2 of the first candidate audio profile 112-1 to generate a right ear average sample 206-2. The left ear average sample 206-1 can represent an average HRIR and/or an average HRTF of the left ear samples 202-1 of the candidate audio profile 112-1 (e.g., the impulse response and/or frequency response of the left ear 124-1 of a user 120 to all audio cues and/or audio frequencies). The right ear average sample 206-2 can represent an average HRIR and/or an average HRTF of the right ear samples 202-2 of the candidate audio profile 112-1 (e.g., the impulse response and/or frequency response of the right ear 124-2 of a user 120 to all audio cues and/or audio frequencies). The audio profile determining engine 114 performs a concatenating 208 of the left ear average sample 206-1 and the right ear average sample 206-2 to generate a first vector representation 210-1 of the first candidate audio profile 112-1. The vector representation 210 of each candidate audio profile 112 includes a response of the left ear 124-1 of the user 120 to one or more frequencies within a frequency range, such as the audible frequency range (e.g., 20 hertz to 20 kilohertz). While not shown, the audio profile determining engine 114 performs similar operations to generate vector representations 210 of each of the other candidate audio profiles 112 of the plurality of candidate audio profiles 112. In various embodiments, the vector representations 210 are compact and efficient representations of the corresponding candidate audio profiles 112. For example, a set of 312 left-ear measurements and a set of 312 right-ear measurements can be compactly represented as a single vector representation 210.

As shown, the audio profile determining engine 114 generates a matrix 212 of the vector representations 210 for each of the candidate audio profiles 112. In various embodiments, the audio profile determining engine 114 concatenates the vector representations 210 along a second axis to generate a two-dimensional matrix 212 of vector representations 210. Each vector representation 210 can be included as a column of the matrix 212.

As shown, the audio profile determining engine 114 performs a binning and normalization operation 214 to the matrix 212. In various embodiments, the audio profile determining engine 114 generates one or more bins, each representing a frequency range within a frequency spectrum of the matrix 212. In various embodiments, the bins can cover only a portion of the audible frequency spectrum (e.g., 1 kilohertz to 14 kilohertz), and other frequencies that are above or below the portion of the audible frequency spectrum can be discarded. The one or more bins can be of same, similar, and/or different sizes. The one or more bins can be spaced linearly or logarithmically over the frequency range. The audio profile determining engine 114 can aggregate the vector representations 210 comprising the columns of the matrix 212 into the bins. For example, for each vector representation 210-1 or column of the matrix 212, the audio profile determining engine 114 can determine an average of two or more vector elements representing audio samples of audio frequencies that are within the frequency range of one bin. Additionally, in various embodiments, the audio profile determining engine 114 normalizes the matrix 212. For example, for each vector element of each vector representation 210-1 or column of the matrix 212, the audio profile determining engine 114 can calculate a logarithmic value of the vector element, such as a normalized logarithmic intensity of a frequency response for each frequency bin within a binned human-audible frequency range. Alternatively or additionally, the audio profile determining engine 114 can normalize the matrix 212 in other ways, such as adding a positive or negative offset or bias to the vector element and/or clipping the vector element based on a high or low clipping value. Based on the binning and normalization operation 214, the audio profile determining engine 114 outputs a binned and normalized matrix 216.

As shown, the audio profile determining engine 114 performs a principal component analysis 218 of the binned and normalized matrix 216. In various embodiments, the audio profile determining engine 114 determines, among a feature set of the binned and normalized matrix 216, a reduced feature set of features that are representative of the matrix 212. That is, the audio profile determining engine 114 determines, among the feature set of the binned and normalized matrix 216, an excludable feature set of features that are not representative of the matrix 212. The audio profile determining engine 114 can retain the reduced feature set and exclude the excluded feature set of the binned and normalized matrix 216 to generate a reduced matrix 220. In various embodiments, the principal component analysis reduces a dimensionality of each vector representation 210 of the matrix 212 from 13,000 features (e.g., 13,000 frequency bins) to 8 features (e.g., 8 frequency bins). The reduced matrix 220 efficiently represents the matrix 212 of vector representations 210 of the candidate audio profiles 112 in a manner that retains significant features in a binned and normalized manner, while removing other features that are not representative of the matrix 212 and the candidate audio profiles 112 encoded into the matrix 212. The reduced matrix significantly reduces the computing cost of determining an audio profile to be used for the device 100 from among the candidate audio profiles. The reduced matrix also allows the selection steps to focus on the most significant differences in the audio features of candidate audio profiles, such as the audio features that distinguish the candidate audio profiles within a first cluster from the candidate audio profiles within a second cluster.

As shown, the audio profile determining engine 114 performs a clustering 222 of the reduced matrix 220 into a plurality of clusters. For example, each column of the matrix 212, corresponding to a vector representation 210 of one of the candidate audio profiles 112 after binning, normalization, and principal component analysis, includes a feature set of features that are represented as rows. The feature space 224 includes a dimensionality that corresponds to the number of features of each vector representation 210, that is, a length of each vector representation 210 and/or a dimension of the matrix 212. The features of each binned, normalized, and PCA-reduced vector representation 210 correspond to a location of the vector representation 210 within the feature space 224. Based on the locations of the vector representations 210, the audio profile determining engine 114 determines a plurality of clusters 226 of vector representations 210. Each cluster 226 includes a number of vector representations 210 that are within a certain proximity to one another within the feature space 224. For example, a first cluster 226-1 includes three of the vector representations 210-1, 210-3, 210-4 that are within a proximity of one another within the feature space 224, and a second cluster 226-2 includes three other vector representations 210-2, 210-5, 210-6 that are also within a proximity of one another within the feature space 224. In various embodiments, the audio profile determining engine 114 performs the clustering 222 according to various clustering techniques, such as a k-medoids clustering technique and/or a Gaussian mixture modeling. In various embodiments, the audio profile determining engine 114 performs the clustering 222 based on a predefined number of clusters 226 (e.g., two clusters). In other various embodiments, the audio profile determining engine 114 also determines a number of clusters 226 by which the vector representations 210 are clustered into a plurality of clusters. For example, the audio profile determining engine 114 can perform a first clustering based on a first number of clusters 226. If the vector representations 210 within each cluster 226 are not within a certain range of tolerance, the audio profile determining engine 114 can perform a second clustering based on a larger number of clusters 226.

As shown, the audio profile determining engine 114 performs a candidate audio profile determination 230 to determine based on the clustering 222 of vector representations 210 within the feature space 224. In various embodiments, for each cluster 226, the audio profile determining engine 114 determines a medoid vector 228, that is, a vector representation 210 of the cluster 226 having a minimal dissimilarity to the other vector representations 210 within the cluster 226. The medoid vector 228 of a cluster 226 represents the candidate audio profile 112 that is the most representative of the candidate audio profiles 112 associated with the cluster 226. For example, for each cluster 226, the audio profile determining engine 114 can determine, for each first vector representation 210 within the cluster 226, an average distance between the first vector representation 210 and each other vector representation 210 associated with the cluster 226. The audio profile determining engine 114 can then determine the medoid vector 228 for each cluster 226 as the first vector representation 210 having the lowest average distance among the calculated average distances of the vector representations 210 of the cluster 226. As shown, the audio profile determining engine 114 determines a first vector representation 210-1 as the medoid vector 228-1 of the first cluster 226-1 and determines a second vector representation 210-2 as the medoid vector 228-2 of the second cluster 226-2.

As shown, the audio profile determining engine 114 determines, by the candidate audio profile determination 230, a number of candidate audio profiles 112 for further evaluation. In various embodiments, the determined candidate audio profiles 112 include the first candidate audio profile 112-1, based on the determination of the first vector representation 210-1 as the first medoid vector 228-1 of the first cluster 226-1, and the second candidate audio profile 112-2, based on the determination of the second vector representation 210-2 as the medoid vector 228-2 of the second cluster 226-2. The audio profile determining engine 114 further evaluates the first candidate audio profile 112-1 and the third candidate audio profile 112-2 in order to determine the audio profile 116 to use for the audio output device 110. The further evaluation is discussed in detail below.

In various embodiments, the audio profile determining engine 114 evaluates the first candidate audio profile 112-1 of the determined plurality of candidate audio profiles 112 through a selection process involving the user. For example, in various embodiments, the device 100 presents a game-style environment to a user and evaluates the candidate audio profiles based on responses of the user. For example, the evaluation can present to the user 120 a multidimensional space 312, such as a virtual reality environment and/or augmented reality environment. Within the multidimensional space 312, the device 100 can display visual indicators 304 (e.g., on a display 302, such as a headset, monitor, or the like) at various intended locations 130, and in which various audio test patterns 310 can be generated by audio output device 110 (e.g., a left speaker 132-1 and a right speaker 132-2) to be perceived at the corresponding intended locations 130. The audio profile determining engine 114 can then ask the user 120 to indicate whether each audio test pattern 310 appears to originate from the same location as the visual indicator 304 within the multidimensional space 312. Based on the responses of the user 120, the audio profile determining engine 114 can determine the clarity and effectiveness of spatial audio generated by the audio output device 110 using the first candidate audio profile 112-1, as perceived by the user 120. An example of the candidate audio profile evaluation process is discussed in detail below in relation to FIGS. 3A-3B and 4A-4B.

Figure 3A:
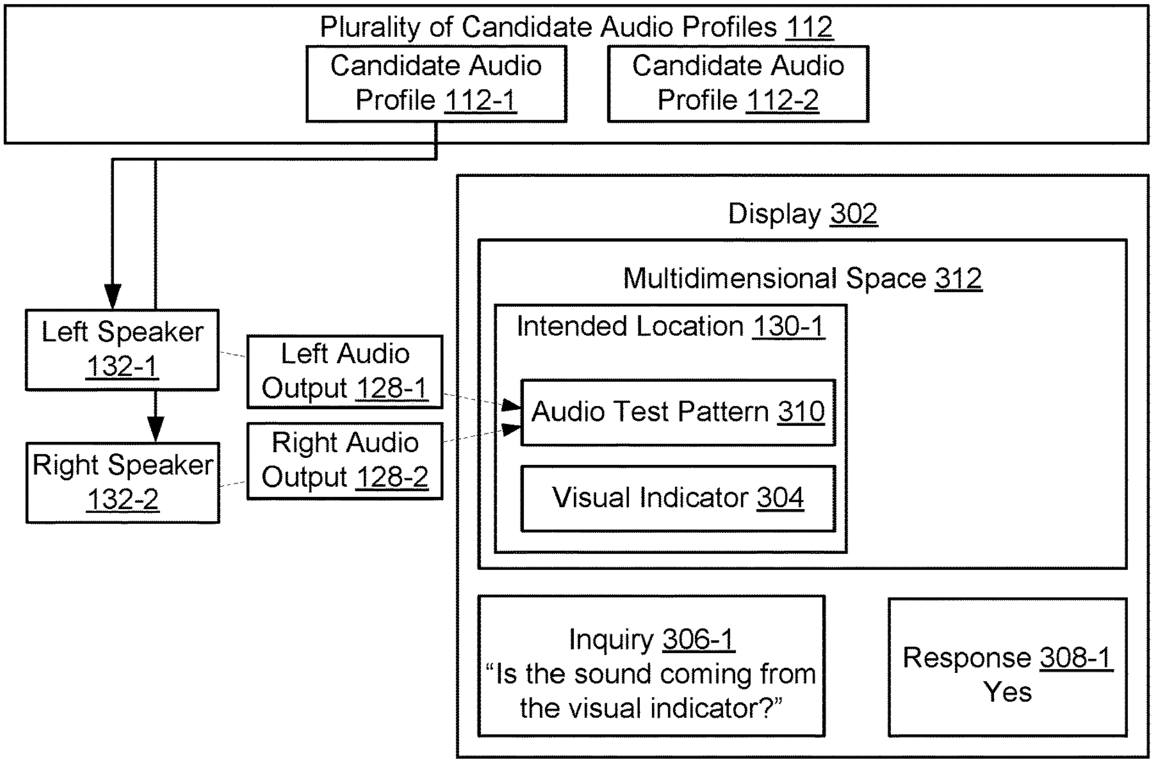
FIGS. 3A-3B are an illustration of a first step of an audio profile selection by the device of FIG. 1, according to various embodiments.
Figure 3B:
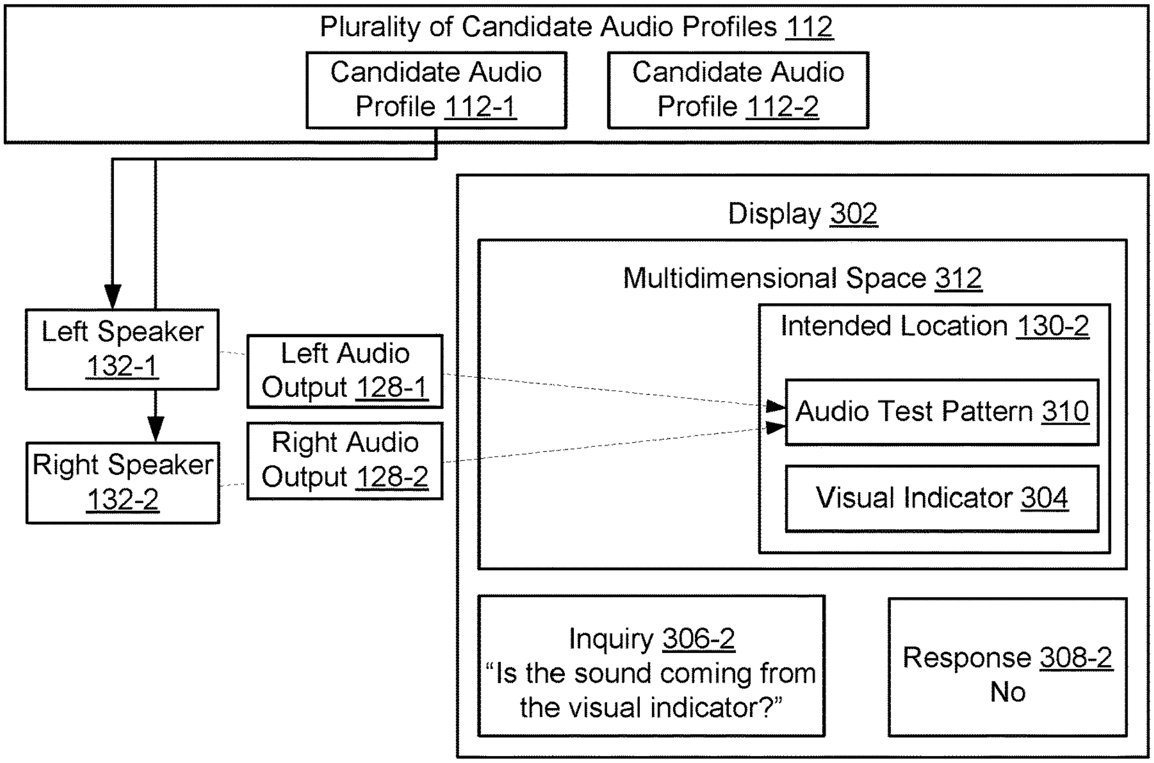

FIGS. 3A-3B are an illustration of a first step of an audio profile selection by the device of FIG. 1, according to various embodiments. In various embodiments, the first step of the audio profile selection is performed by the audio profile determining engine 114 of FIG. 1. In various embodiments, the audio profile selection is based on the determination of candidate audio profiles 112 as shown in FIG. 2.

As shown, in FIG. 3A, at a first time, the audio profile determining engine 114 generates an audio test pattern 310 that is intended to be perceived by a user 120 as occurring at a first intended location 130-1. In various embodiments, the audio profile determining engine 114 applies the first candidate audio profile 112-1 to an audio input 126 to cause the left speaker 132-1 to generate a left audio output 128-1, and to cause the right speaker 132-2 to generate a right audio output 128-2. The combination of the left audio output 128-1 and the right audio output 128-2, based on the first candidate audio profile 112-1, generates the audio test pattern 310 that the user 120 should perceive at the first intended location 130-1. Concurrently, the audio profile determining engine 114 displays a visual indicator 304 on the display 302 that corresponds to the first intended location 130-1. The audio profile determining engine 114 presents, to the user 120, a first inquiry 306-1 as to whether the sound is originating from the same location as the visual indicator 304 (e.g., the first intended location 130-1). The audio profile determining engine 114 receives, from the user 120, a first response 308-1 including a user agreement, confirming that the user 120 perceives the sound as originating from the same location as the visual indicator 304. Based on the first response 308-1, the audio profile determining engine 114 continues evaluating the first candidate audio profile 112-1.

As shown, in FIG. 3B, at a second time, the audio profile determining engine 114 generates an audio test pattern 310 that is intended to be perceived by the user 120 as occurring at a second intended location 130-2. In various embodiments, the audio profile determining engine 114 applies the first candidate audio profile 112-1 to an audio input 126 to cause the left speaker 132-1 to generate a left audio output 128-1, and to cause the right speaker 132-2 to generate a right audio output 128-2. The combination of the left audio output 128-1 and the right audio output 128-2, based on the first candidate audio profile 112-1, generates the audio test pattern 310 that the user 120 should perceive at the second intended location 130-2. Concurrently, the audio profile determining engine 114 displays a visual indicator 304 on the display 302 that corresponds to the second intended location 130-2. The audio profile determining engine 114 presents, to the user 120, a second inquiry 306-2 as to whether the sound is originating from the same location as the visual indicator 304 (e.g., the second intended location 130-2). The audio profile determining engine 114 receives, from the user 120, a second response 308-2 including a user disagreement, indicating that the user 120 does not perceive the sound as originating from the same location as the visual indicator 304. Based on the second response 308-2, the audio profile determining engine 114 determines that the first candidate audio profile 112-1 is not to be used as the audio profile 116 for the audio output device 110. Instead, the audio profile determining engine 114 proceeds with a second step of the audio profile selection in which another candidate audio profile 112 is evaluated.

Figure 4A:
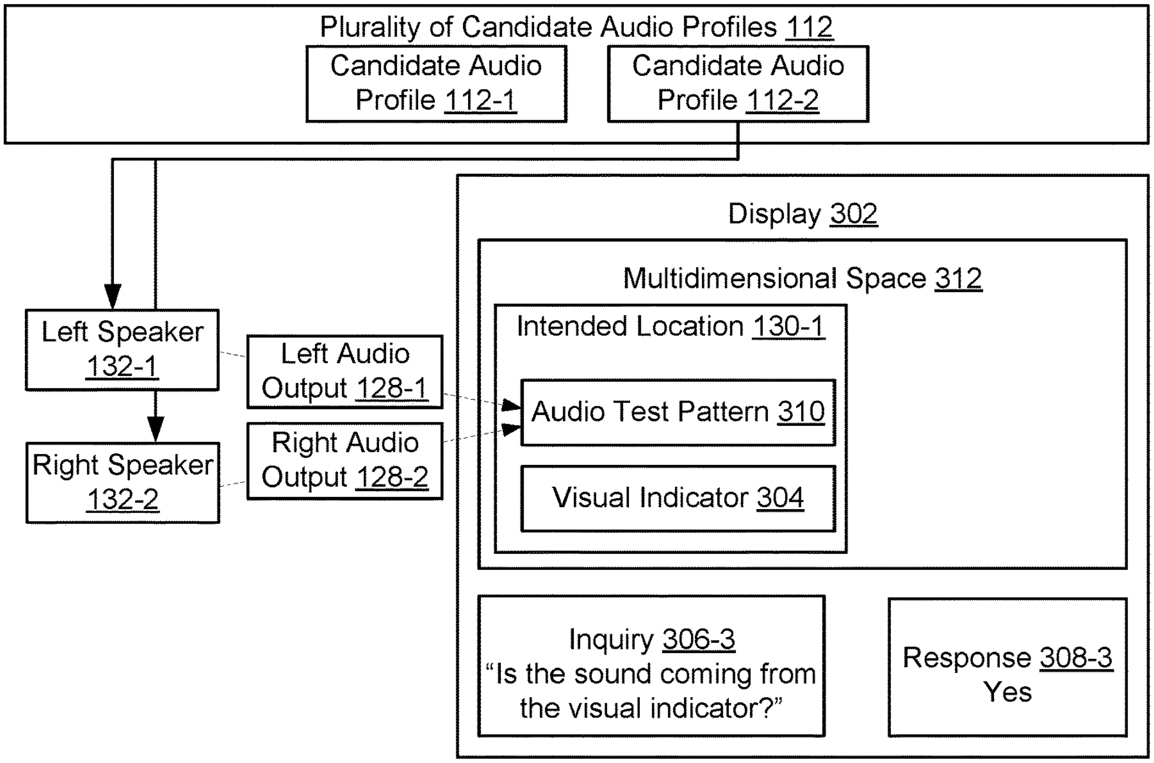
FIGS. 4A-4B are an illustration of a second step of an audio profile selection by the device of FIG. 1, according to various embodiments.
Figure 4B:
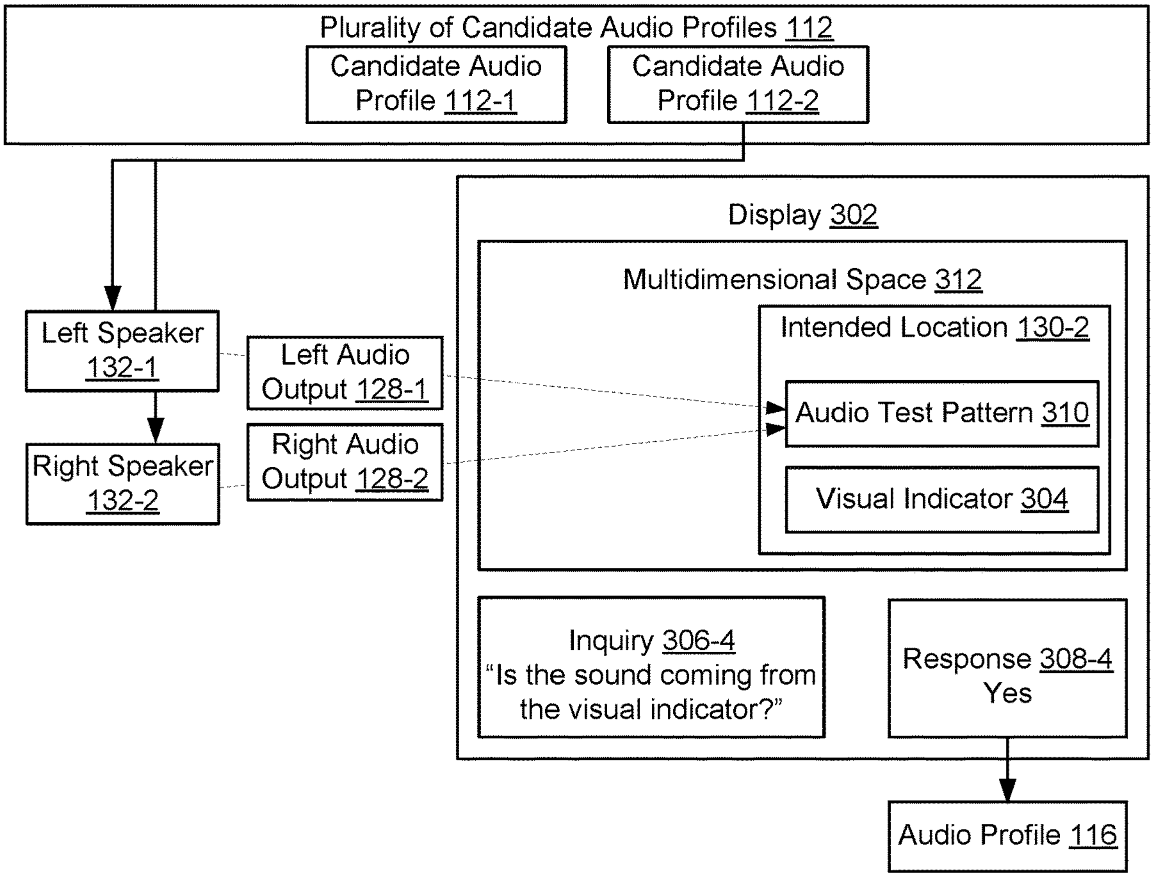

FIGS. 4A-4B are an illustration of a second step of an audio profile selection by the device of FIG. 1, according to various embodiments. In various embodiments, the second step of the audio profile selection is performed by the audio profile determining engine 114 of FIG. 1. In various embodiments, the audio profile selection is based on the determination of candidate audio profiles 112 as shown in FIG. 2.

As shown, in FIG. 4A, at a third time, the audio profile determining engine 114 generates an audio test pattern 310 that is intended to be perceived by the user 120 as occurring at the first intended location 130-1. In various embodiments, the audio profile determining engine 114 applies the second candidate audio profile 112-2 to the audio input 126 to cause the left speaker 132-1 to generate a left audio output 128-1, and to cause the right speaker 132-2 to generate a right audio output 128-2. The combination of the left audio output 128-1 and the right audio output 128-2, based on the second candidate audio profile 112-2, generates the audio test pattern 310 that the user 120 should perceive at the first intended location 130-1. Concurrently, the audio profile determining engine 114 displays a visual indicator 304 on the display 302 that corresponds to the first intended location 130-1. The audio profile determining engine 114 presents, to the user 120, a third inquiry 306-3 as to whether the sound is originating from the same location as the visual indicator 304 (e.g., the first intended location 130-1). The audio profile determining engine 114 receives, from the user 120, a third response 308-3 including a user agreement, confirming that the user 120 perceives the sound as originating from the same location as the visual indicator 304. Based on the third response 308-3, the audio profile determining engine 114 continues evaluating the second candidate audio profile 112-2.

As shown, in FIG. 4B, at a fourth time, the audio profile determining engine 114 generates an audio test pattern 310 that is intended to be perceived by the user 120 as occurring at the second intended location 130-2. In various embodiments, the audio profile determining engine 114 applies the second candidate audio profile 112-2 to an audio input 126 to cause the left speaker 132-1 to generate a left audio output 128-1, and to cause the right speaker 132-2 to generate a right audio output 128-2. The combination of the left audio output 128-1 and the right audio output 128-2, based on the second candidate audio profile 112-2, generates the audio test pattern 310 that the user 120 should perceive at the second intended location 130-2. Concurrently, the audio profile determining engine 114 displays a visual indicator 304 on the display 302 that corresponds to the second intended location 130-2. The audio profile determining engine 114 presents, to the user 120, a fourth inquiry 306-4 as to whether the sound is originating from the same location as the visual indicator 304 (e.g., the second intended location 130-2). The audio profile determining engine 114 receives, from the user 120, a fourth response 308-4 including a user agreement, confirming that the user 120 perceives the sound as originating from the same location as the visual indicator 304. Based on the fourth response 308-4, the audio profile determining engine 114 determines that the second candidate audio profile 112-2 is to be used as the audio profile 116 for the audio output device 110.

In various embodiments, the audio profile determining engine 114 can perform the candidate audio profile evaluation process, such as shown in FIGS. 3A-3B and 4A-4B, in various ways. For example, in various embodiments, the audio profile determining engine 114 can present the visual indicators 304 in various ways, such as a symbol shown within the multidimensional space 312, or a character or object that is the source of the sound comprising the audio test pattern 310. In various embodiments, rather than generating visual indicators 304, the audio profile determining engine 114 could generate each inquiry 306 as a question about the perceived location of the audio test pattern 310 (e.g.: "Does the sound seem to be near your left ear?") In various embodiments, rather than generating inquiries 306, the audio profile determining engine 114 could generate audio test pattern 310 and determine the response 308 of the user 120 based on user input received from the user 120. For example, the audio profile determining engine 114 can ask the user 120 to move his or her head 122 to look at the location at which the audio test pattern 310 is perceived to be originating. Based on sensor feedback (e.g., a head-tracking camera that visually determines a head orientation of the 120, or an eye-tracking camera that visually determines the eye-gaze orientation of the 120, or an orientation sensor included in a helmet worn by the user 120), the audio profile determining engine 114 can determine whether the user 120 is looking toward the intended location 130 or is looking elsewhere. As another example, the audio profile determining engine 114 can ask the user 120 to point toward the location at which the user 120 perceives the audio test pattern 310 to be originating. Based on sensor feedback (e.g., a hand-tracking camera that visually determines a hand orientation of the 120, or an orientation sensor included in a glove worn by the user 120), the audio profile determining engine 114 can determine whether the user 120 is pointing toward the intended location 130 or is pointing elsewhere.

In various embodiments, the audio profile determining engine 114 can perform the candidate audio profile evaluation process of various candidate audio profiles 112 in various ways. As shown in FIGS. 3A-3B, the audio profile determining engine 114 can perform a first step including evaluating a first candidate audio profile 112-1. Based on the responses 308 of the user 120 during the first step, the audio profile determining engine 114 can either determine the first candidate audio profile 112-1 as the audio profile 116 for the audio output device 110, or discard the first candidate audio profile 112-1 and continue to the second step to evaluate a second candidate audio profile 112-2. As another example, in various embodiments, the audio profile determining engine 114 can evaluate each of at least two candidate audio profiles 112 and then determine the audio profile 116 based on a comparison of the responses 308 of the user 120 to each of the at least two candidate audio profiles 112. For example, the audio profile determining engine 114 can assign a score to each of two or more candidate audio profiles 112 based on the responses 308 of the user 120, and then select the candidate audio profile 112 that has been assigned a higher or highest score. As yet another example, in various embodiments, the audio profile determining engine 114 can concurrently evaluate each of at least two candidate audio profiles 112. For example, the audio profile determining engine 114 can generate a first audio test pattern 310 based on a first candidate audio profile 112-1 (e.g., a tone at a first time) and a second audio test pattern 310 based on a second candidate audio profile 112-2 (e.g., a tone at a second time) and then present to the user 120 an inquiry 306 that asks which audio test pattern 310 more closely matches the intended location 130-1 of the visual indicator 304. Based on the response 308 of the user 120 indicating a preference or selection of one of the audio test patterns 310 (e.g., the second tone), the audio profile determining engine 114 can select one of the candidate audio profiles 112 as the audio profile 116 for the audio output device 110. As yet another example, the audio profile determining engine 114 can generate several audio test patterns 310 for the user 120, and then receive, from the user 120, one or more responses 308 that indicate a user preference ranking of the audio test patterns 310. Based on the responses 308, the audio profile determining engine 114 can determine a user preference ranking of the at least two candidate audio profiles 112, and can determine the audio profile 116 for the audio output device 110 based on the user preference ranking of the at least two candidate audio profiles 112. As yet another example, the audio profile determining engine 114 can determine, among the at least two candidate audio profiles 112, the candidate audio profile 112 for which the locations indicated by the user 120 more closely or most closely match the intended locations 130 of the corresponding audio test patterns 310.

In some cases, the responses 308 of the user 120 could indicate that neither or none of two or more audio test patterns 310 matches the locations of the visual indicators 304. For example, the user input received from the user 120 could indicate that the user 120 does not perceive the audio as originating from an intended location, that the user 120 perceives the audio as originating from a location other than the intended location, or that scores received from the user 120 are not above a threshold. Based on the responses 308 of the user 120, the device 100 could determine that neither or none of two or more candidate audio profiles 112 used to present the audio test patterns 310 to the user 120 causes the audio output device 110 to generate clear and effective spatial audio for the user 120. In various embodiments, the audio profile determining engine 114 can determine that the responses 308 of the user 120 indicate a rejection of the two or more candidate audio profiles 112 that were determined based on the plurality of clusters 226. Based on the rejection, the audio profile determining engine 114 can re-cluster the vector representations 210, excluding the two or more vector representations 210 that correspond to the candidate audio profile 112 that were determined for evaluation based on the first plurality of clusters 226. Based on the re-clustering, the audio profile determining engine 114 can determine two or more updated clusters 226. The audio profile determining engine 114 can determine another vector representation 210 for each of the two or more updated clusters 226 (e.g., a medoid vector 228 of each of the two or more updated clusters 226). The audio profile determining engine 114 can perform another round of evaluation based on the candidate audio profiles 112 corresponding to the two or more another vector representations 210.

Figure 5:
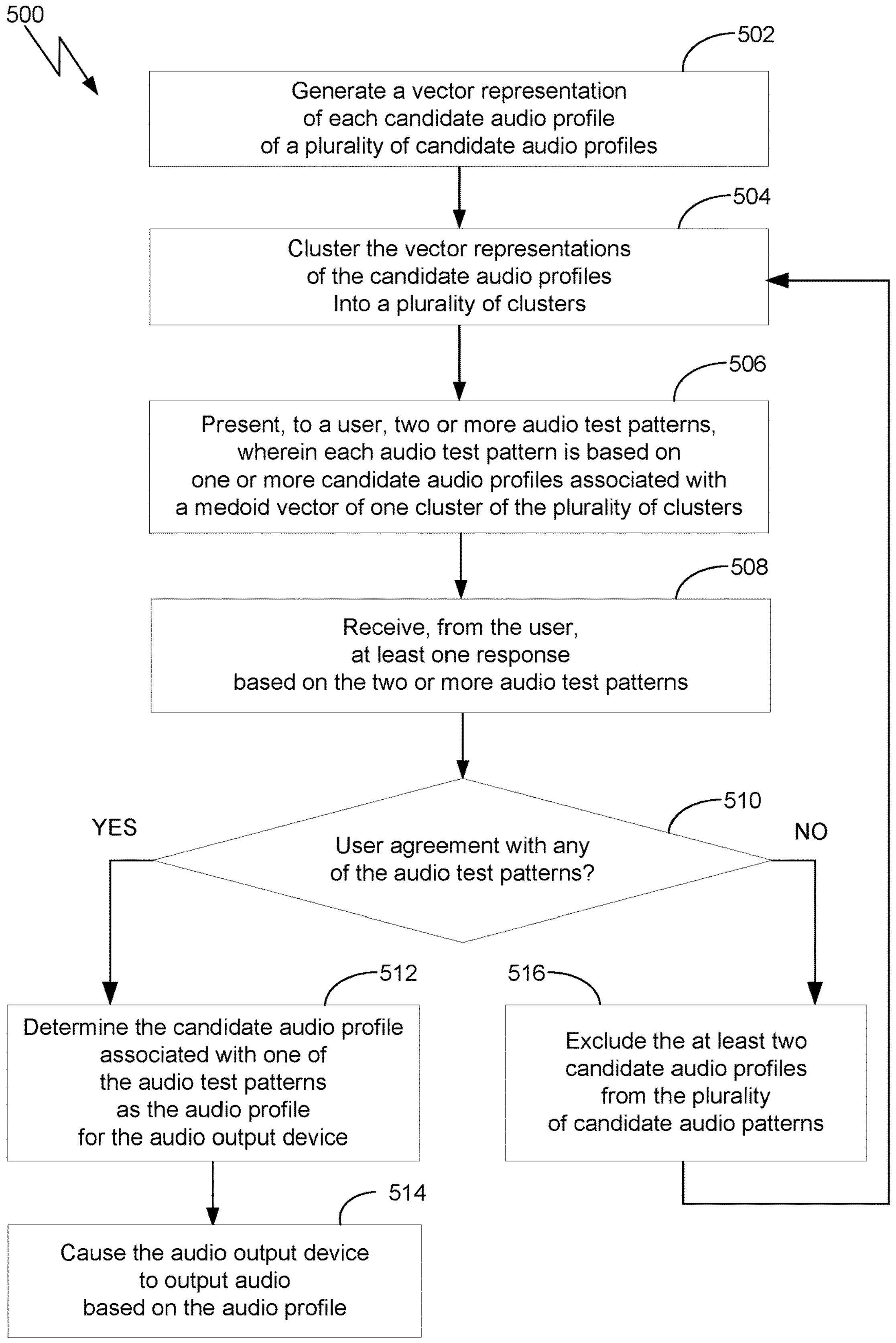
FIG. 5 illustrates a flow diagram of method steps for determining an audio profile for an audio output device, according to various embodiments.

FIG. 5 illustrates a flow diagram of method steps for determining an audio profile for an audio output device, according to various embodiments. In various embodiments, at least some of the method steps of FIG. 5 are performed by the audio profile determining engine 114 and/or the audio rendering engine 118 of FIG. 1. Although the method steps are described with respect to the systems of FIGS. 1 through 4B, persons skilled in the art will understand that any system configured to perform the method steps, in any order, falls within the scope of the various embodiments.

As shown, a method 500 begins at step 502 in which the audio profile determining engine generates a vector representation of each candidate audio profile of a plurality of candidate audio profiles. In various embodiments, each vector representation aggregates two or more left ear samples and two or more right ear samples. In various embodiments, each vector representation concatenates an average left ear sample and an average right ear sample. In various embodiments, the vector representations of the candidate audio profiles are further processed, such as by aggregation into a matrix, binning, normalization, and/or a principal component analysis. In various embodiments, generating the vector representations can be performed according to at least some of the method steps of the flow diagram of FIG. 6.

At step 504, the audio profile determining engine clusters the vector representations of the candidate audio profiles into a plurality of clusters. In various embodiments, the audio profile determining engine determines the locations of the vector representations within a feature space and determines the clusters of vectors that are within a proximity of one another. In various embodiments, the audio profile determining engine determines the clusters based on a clustering technique, such as a k-medoids clustering technique. In various embodiments, the audio profile determining engine clusters the vector representations according to a predefined number of clusters (e.g., two clusters). In various embodiments, the clustering can be performed according to at least some of the method steps of the flow diagram of FIG. 6.

At step 506, the audio profile determining engine presents, to a user, two or more audio test patterns, wherein each audio test pattern is based on one or more candidate audio profiles that are associated with a medoid vector of one cluster of the plurality of clusters. In various embodiments, the audio profile determining engine presents the two or more audio test patterns to the user. In various embodiments, the audio profile determining engine generates each audio test pattern to be perceived by the user at an intended location within a multidimensional space (e.g., a virtual reality environment or augmented reality environment), based on one of the candidate audio profiles. In various embodiments, the audio profile determining engine concurrently displays a visual indicator at the intended location within the multidimensional space. Alternatively or additionally, in various embodiments, the audio profile determining engine asks the user to indicate the location within the multidimensional space where the user perceives the audio test pattern to originate.

At step 508, the audio profile determining engine receives, from the user, at least one response based on the two or more audio test patterns. In various embodiments, the audio profile determining engine receives either a user agreement or a user disagreement as to whether the user perceives the audio test pattern to originate from the same location as a displayed visual indicator. In various embodiments, the audio profile determining engine detects a location where the user is looking or pointing, as the location where the user perceives each audio test pattern to originate, and determines whether each location indicated by the user match the intended location of each audio test pattern.

At step 510, the audio profile determining engine determines that the candidate audio profile associated with one of the audio test patterns is to be used as the audio profile for the audio output device. In various embodiments, the audio profile determining engine determines the audio profile as the candidate audio profile for which the locations indicated by the user more closely or most closely match the intended locations of the audio test patterns. In various embodiments, the audio profile determining engine determines the audio profile as the candidate audio profile having a highest user preference ranking among the candidate audio profiles.

At step 512, the audio profile determining engine determines an audio profile for the audio output device based on the at least one response of the user. In various embodiments, the audio profile determining engine determines the audio profile as one of the candidate audio profiles for which the user indicated a user agreement with the presented audio test patterns. In various embodiments, the audio profile determining engine determines a user preference ranking of the at least two candidate audio profiles for which the audio profile determining engine presented audio test patterns.

At step 514, the audio rendering engine causes the audio output device to output audio based on the audio profile. In various embodiments, the audio rendering engine renders spatial audio based on the audio profile, wherein the combination of a left audio output of a left speaker and a right audio output of a right speaker cause the user to perceive an audio output as originating at an intended location relative to the head of the user.

At step 516, the audio profile determining engine excludes the at least two candidate audio profiles from the plurality of candidate audio test patterns. The audio profile determining engine then returns to step 504 to determine another candidate audio profile (e.g., at least two other candidate audio profiles) based on a re-clustering of the plurality of candidate audio profiles, excluding the first at least two candidate audio profiles.

Figure 6:
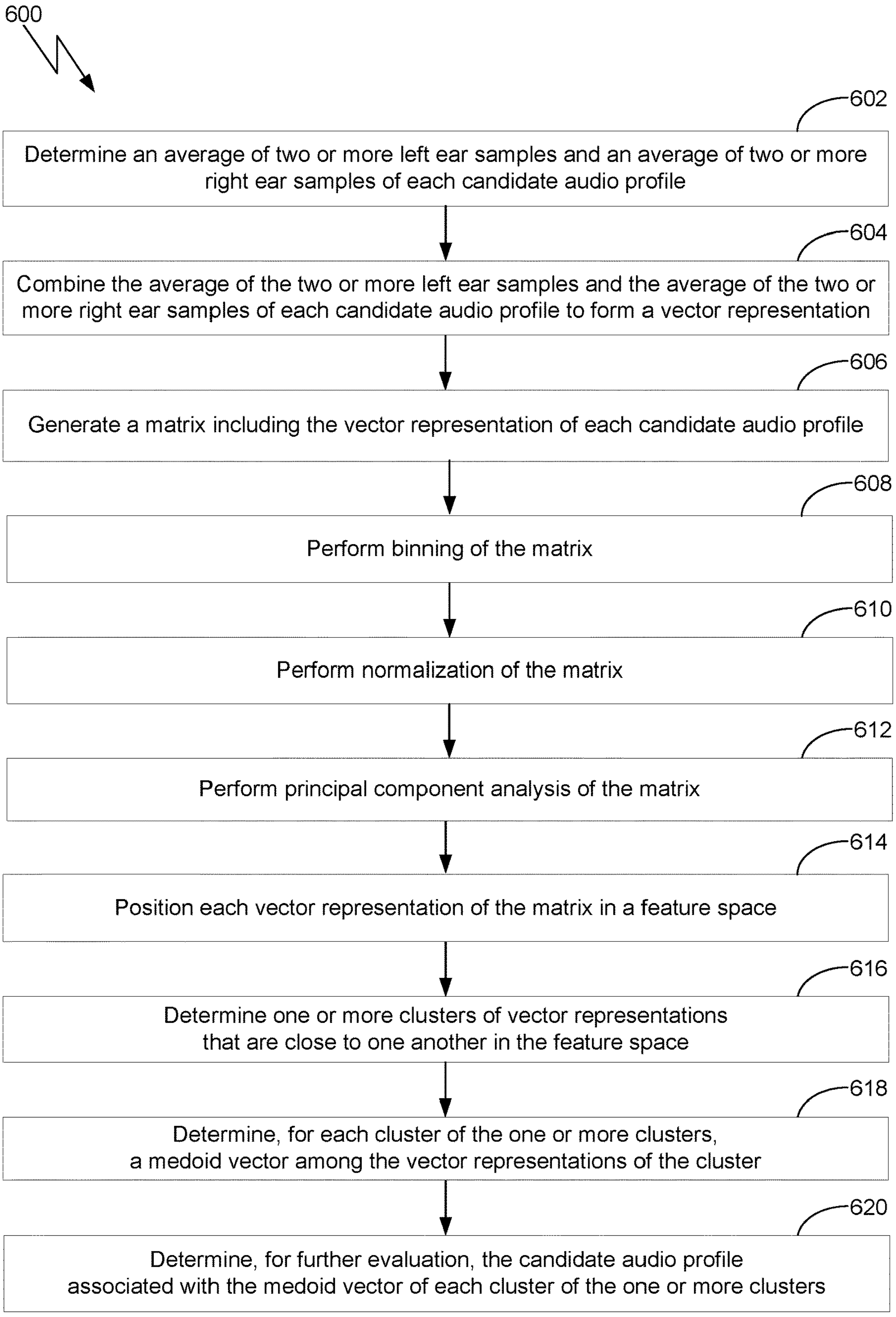
FIG. 6 illustrates a flow diagram of method steps for determining one or more candidate audio profiles for an audio output device, according to various embodiments.

FIG. 6 illustrates a flow diagram of method steps for determining one or more candidate audio profiles for an audio output device, according to various embodiments. In various embodiments, at least some of the method steps of FIG. 6 are performed by the audio profile determining engine 114 of FIG. 1. In various embodiments, the method steps of the flow diagram of FIG. 6 can be performed at steps 502 and 504 of FIG. 5. Although the method steps are described with respect to the systems of FIGS. 1 through 5, persons skilled in the art will understand that any system configured to perform the method steps, in any order, falls within the scope of the various embodiments.

As shown, a method 600 begins at step 602 in which the audio profile determining engine determines an average of two or more left ear samples and an average of two or more right ear samples of each candidate audio profile. In various embodiments, the averaging can involve a determination of a mathematical mean or median of the two or more left ear samples to determine the average of the two or more left ear samples, and a determination of a mathematical mean or median of the two or more right ear samples to determine the average of the two or more right ear samples (e.g., the impulse response and/or frequency response of the left ear of a user to all audio cues and/or audio frequencies). The average of the left ear samples can represent an average HRIR and/or an average HRTF of the left ear samples of the candidate audio profile. The average of the right ear samples can represent an average HRIR and/or an average HRTF of the right ear samples of the candidate audio profile (e.g., the impulse response and/or frequency response of the right ear of a user to all audio cues and/or audio frequencies).

At step 604, the audio profile determining engine combines the average of the two or more left ear samples and the average of the two or more right ear samples of each candidate audio profile to form a vector representation. In various embodiments, the combining can include concatenating the average of the two or more left ear samples and the average of the two or more right ear samples.

At step 606, the audio profile determining engine generates a matrix including the vector representation of each candidate audio profile. In various embodiments, the generating includes combining a one-dimensional vector representation of each candidate audio profile along a second dimension of the matrix.

At step 608, the audio profile determining engine performs binning of the matrix. In various embodiments, the audio profile determining engine generates one or more bins, each representing a frequency range within a frequency spectrum of the matrix. In various embodiments, the audio profile determining engine generates one or more bins, each representing a frequency range within a frequency spectrum of the matrix. In various embodiments, the bins can cover only a portion of the audible frequency spectrum (e.g., 1 kilohertz to 14 kilohertz), and other frequencies that are above or below the portion of the audible frequency spectrum can be discarded.

At step 610, the audio profile determining engine performs a normalization of the matrix. In various embodiments, for each vector element of each vector representation or column of the matrix, the audio profile determining engine calculates a logarithmic value of the vector element, such as a normalized logarithmic intensity of a frequency response for each frequency bin within a binned human-audible frequency range. In various embodiments, the audio profile determining engine normalizes the matrix in other ways, such as adding a positive or negative offset or bias to the vector element and/or clipping the vector element based on a high or low clipping value.

At step 612, the audio profile determining engine performs a principal component analysis of the matrix. In various embodiments, the audio profile determining engine determines, among a feature set of the binned and normalized matrix, a reduced feature set of features that are representative of the matrix. In various embodiments, the audio profile determining engine determines, among the feature set of the binned and normalized matrix, an excludable feature set of features that are not representative of the matrix. In various embodiments, the audio profile determining engine retains a reduced feature set and exclude the excluded feature set of the binned and normalized matrix to generate a reduced matrix.

At step 614, the audio profile determining engine positions each vector representation of the matrix in a feature space. In various embodiments, the feature space includes a dimensionality that corresponds to the number of features of each vector representation, that is, a length of each vector representation.

At step 616, the audio profile determining engine determines one or more clusters of vector representations that are close to one another in the feature space. In various embodiments, the clustering groups the vectors based on their distance to other vectors within the feature space and identifies each cluster based on the vectors that are within a certain distance of other vectors in the feature space. In various embodiments, the clustering includes one or more clustering techniques, such as k-medoids clustering technique and/or a Gaussian mixture modeling technique.

At step 618, the audio profile determining engine determines, for each cluster of the one or more clusters, a medoid vector among the vector representations of the cluster. In various embodiments, the medoid vector is the vector representation of the cluster having a minimal dissimilarity to the other vector representations within the cluster. In various embodiments, the medoid vector of a cluster represents the candidate audio profile that is the most representative of the candidate audio profiles associated with the cluster.

At step 620, the audio profile determining engine determines, for further evaluation, the candidate audio profile associated with the medoid vector of each cluster of the one or more clusters. In various embodiments, the determined candidate audio profiles are further evaluated by a selection process involving the user. In various embodiments, the selection process includes method steps 506-516 of FIG. 5.

In sum, techniques for selecting an audio profile for a user include generating a vector representation of each candidate audio profile of a plurality of candidate audio profiles and clustering the vector representations into a plurality of clusters. Clustering the vector representations enables a determination of which candidate audio profiles are highly representative among the candidate audio profiles associated with each cluster. The techniques also include determining an audio profile for the user based on the plurality of clusters. Determining the audio profile based on the plurality of clusters enables a determination of the audio profile that is likely to cause the spatial audio generated by the device to be accurately perceived by the user. The techniques also include presenting, to the user, audio test patterns that are each based on one or more candidate audio profiles that are associated with one of the clusters. Based on responses received from the user to the audio test patterns, an audio profile is determined and used to present audio to the user. Selecting the audio profile based on user responses to the presented audio test patterns can allow the audio output device to be configured with a suitable audio profile through a simplified and enjoyable user experience.

At least one technical advantage of the disclosed techniques relative to the prior art is that, with the disclosed techniques, a user can be quickly and effectively guided through the process of selecting an effective audio profile usable by an audio output device to generate spatial audio for the user. The disclosed techniques further increase the likelihood that the user will select an effective audio profile so that an audio output device is able to generate improved spatial audio that spatial audio using audio profiles selected by other techniques. The disclosed techniques also reduce the computing resources needed to select candidate audio profiles from a potentially large number of audio profiles while also improving the likelihood that a candidate profiles will be effective for the user. The ability to select better candidate profiles reduces the number of candidate profiles that have to be considered during the audio profile selection process, which further reduces the time spent selecting an audio profile and the computing resources used to select the audio profile. These technical advantages provide one or more technological improvements over prior art approaches.

1. In various embodiments, a computer-implemented method of selecting an audio profile comprises generating a plurality of vector representations, wherein each vector representation of the plurality of vector representations is based on a candidate audio profile of a plurality of candidate audio profiles; clustering the plurality of vector representations into a plurality of clusters; selecting a first candidate audio profile that is representative of the plurality of candidate audio profiles included in a first cluster of the plurality of clusters; presenting, to a user, a plurality of audio test patterns, wherein each audio test pattern is rendered based on the first candidate audio profile; receiving, from the user, at least one response based on the plurality of audio test patterns; and determining an audio profile for an audio output device based on the at least one response of the user.

2. The computer-implemented method of clause 1, wherein generating the plurality of vector representations comprises generating a vector representation of the first candidate audio profile by aggregating two or more left ear measurements of the first candidate audio profile and aggregating two or more right ear measurements of the first candidate audio profile.

3. The computer-implemented method of clauses 1 or 2, wherein generating the plurality of vector representations comprises generating a vector representation for the first candidate audio profile based on a normalized logarithmic intensity of a frequency response of the first candidate audio profile for each frequency bin within a binned human-audible frequency range.

4. The computer-implemented method of any of clauses 1-3, wherein generating the plurality of vector representations further comprises performing principal component analysis of the plurality of candidate audio profiles.

5. The computer-implemented method of any of clauses 1-4, wherein selecting the first candidate audio profile comprises determining that the first candidate audio profile corresponds to a medoid vector of the first cluster.

6. The computer-implemented method of any of clauses 1-5, wherein presenting the plurality of audio test patterns comprises generating a location within a multidimensional space relative to a head of the user, generating a visual representation of a sound source displayed at the location, and rendering a first audio test pattern originating at the location based on the first candidate audio profile.

7. The computer-implemented method of any of clauses 1-6, wherein receiving the at least one response of the user comprises receiving from the user, an indication of whether the user perceived the first audio test pattern as originating at the location.

8. The computer-implemented method of any of clauses 1-7, further comprising selecting a second candidate audio profile that is representative of the plurality of candidate audio profiles included in a second cluster of the plurality of clusters; and generating a second plurality of audio test patterns, wherein each audio test pattern of the second plurality of audio test patterns is rendered based on the second candidate audio profile, wherein receiving at least one response of the user based on the second plurality of audio test patterns further comprises receiving, from the user, a user preference ranking between the first candidate audio profile and the second candidate audio profile.

9. The computer-implemented method of any of clauses 1-8, further comprising receiving, from the user, an indication of a rejection of the first candidate audio profile; excluding, from the plurality of vector representations, a vector representation corresponding to the first candidate audio profile; and re-clustering the plurality of vector representations into an updated plurality of clusters; selecting a second candidate audio profile that is representative of the plurality of candidate audio profiles included in a second cluster of the updated plurality of clusters; presenting, to a user, a plurality of additional audio test patterns, wherein each audio test pattern of the plurality of additional audio test patterns is rendered based on the second candidate audio profile; receiving, from the user, at least one additional response based on the plurality of additional audio test patterns; and determining an audio profile for the audio output device based on the at least one additional response of the user.

10. In various embodiments, one or more non-transitory computer readable media stores instructions that, when executed by one or more processors, cause the one or more processors to perform the steps of generating a plurality of vector representations, wherein each vector representation of the plurality of vector representations is based on a candidate audio profile of a plurality of candidate audio profiles; clustering the plurality of vector representations into a plurality of clusters; selecting a first candidate audio profile that is representative of the plurality of candidate audio profiles included in a first cluster of the plurality of clusters; presenting, to a user, a plurality of audio test patterns, wherein each audio test pattern is rendered based on the first candidate audio profile; receiving, from the user, at least one response based on the plurality of audio test patterns; and determining an audio profile for an audio output device based on the at least one response of the user.

11. The one or more non-transitory computer readable media of clause 10, wherein the step of generating the plurality of vector representations comprises the step of generating a vector representation of the first candidate audio profile by aggregating two or more left ear measurements of the first candidate audio profile and aggregating two or more right ear measurements of the first candidate audio profile.

12. The one or more non-transitory computer readable media of clauses 10 or 11, wherein the step of generating the plurality of vector representations comprises the step of generating a vector representation for the first candidate audio profile based on a normalized logarithmic intensity of a frequency response of the first candidate audio profile for each frequency bin within a binned human-audible frequency range.

13. The one or more non-transitory computer readable media of any of clauses 10-12, wherein the step of generating the plurality of vector representations further comprises the step of performing principal component analysis of the plurality of candidate audio profiles.

14. The one or more non-transitory computer readable media of any of clauses 10-13, wherein the step of selecting the first candidate audio profile comprises the step of determining that the first candidate audio profile corresponds to a medoid vector of the first cluster.

15. The one or more non-transitory computer readable media of any of clauses 10-14, wherein the step of presenting the plurality of audio test patterns comprises the steps of generating a location within a multidimensional space relative to a head of the user; generating a visual representation of a sound source displayed at the location; and rendering a first audio test pattern originating at the location based on the first candidate audio profile.

16. The one or more non-transitory computer readable media of any of clauses 10-15, wherein the step of receiving the at least one response of the user comprises the step of receiving from the user, an indication of whether the user perceived the first audio test pattern as originating at the location.

17. The one or more non-transitory computer readable media of any of clauses 10-16, further comprising the steps of selecting a second candidate audio profile that is representative of the plurality of candidate audio profiles included in a second cluster of the plurality of clusters; generating a second plurality of audio test patterns, wherein each audio test pattern of the second plurality of audio test patterns is rendered based on the second candidate audio profile; and receiving, from the user, a user preference ranking between the first candidate audio profile and the second candidate audio profile.

18. The one or more non-transitory computer readable media of any of clauses 10-17, further comprising the steps of receiving, from the user, an indication of a rejection of the first candidate audio profile; excluding, from the plurality of vector representations, a vector representation corresponding to the first candidate audio profile; re-clustering the plurality of vector representations into an updated plurality of clusters; selecting a second candidate audio profile that is representative of the plurality of candidate audio profiles included in a second cluster of the updated plurality of clusters; presenting, to a user, a plurality of additional audio test patterns, wherein each audio test pattern of the plurality of additional audio test patterns is rendered based on the second candidate audio profile; receiving, from the user, at least one additional response based on the plurality of additional audio test patterns; and determining an audio profile for the audio output device based on the at least one additional response of the user.

19. In various embodiments, a system comprises a memory storing instructions, and one or more processors that execute the instructions to perform steps comprising generating a plurality of vector representations, wherein each vector representation of the plurality of vector representations is based on a candidate audio profile of a plurality of candidate audio profiles; clustering the plurality of vector representations into a plurality of clusters; selecting a first candidate audio profile that is representative of the plurality of candidate audio profiles included in a first cluster of the plurality of clusters; presenting, to a user, a plurality of audio test patterns, wherein each audio test pattern is rendered based on the first candidate audio profile; receiving, from the user, at least one response based on the plurality of audio test patterns; and determining an audio profile for an audio output device based on the at least one response of the user.

20. The system of clause 19, further comprising the audio output device, wherein the step of determining the audio profile further comprises the step of determining the audio profile for the audio output device based on a medoid vector of at least one cluster of the plurality of clusters; and the steps further comprise rendering spatial audio through the audio output device based on the audio profile determined for the audio output device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method of selecting an audio profile, the method comprising:

generating a plurality of vector representations, wherein each vector representation of the plurality of vector representations is based on a candidate audio profile of a plurality of candidate audio profiles;

clustering the plurality of vector representations into a plurality of clusters;

selecting a first candidate audio profile that is representative of the plurality of candidate audio profiles included in a first cluster of the plurality of clusters;

presenting, to a user, a plurality of audio test patterns, wherein each audio test pattern is rendered based on the first candidate audio profile;

receiving, from the user, at least one response based on the plurality of audio test patterns; and determining an audio profile for an audio output device based on the at least one response of the user.

2. The computer-implemented method of claim 1, wherein generating the plurality of vector representations comprises generating a vector representation of the first candidate audio profile by aggregating two or more left ear measurements of the first candidate audio profile and aggregating two or more right ear measurements of the first candidate audio profile.

3. The computer-implemented method of claim 1, wherein generating the plurality of vector representations comprises generating a vector representation for the first candidate audio profile based on a normalized logarithmic intensity of a frequency response of the first candidate audio profile for each frequency bin within a binned human-audible frequency range.

4. The computer-implemented method of claim 1, wherein generating the plurality of vector representations further comprises performing principal component analysis of the plurality of candidate audio profiles.

5. The computer-implemented method of claim 1, wherein selecting the first candidate audio profile comprises determining that the first candidate audio profile corresponds to a medoid vector of the first cluster.

6. The computer-implemented method of claim 1, wherein presenting the plurality of audio test patterns comprises:

generating a location within a multidimensional space relative to a head of the user;

generating a visual representation of a sound source displayed at the location; and rendering a first audio test pattern originating at the location based on the first candidate audio profile.

7. The computer-implemented method of claim 6, wherein receiving the at least one response of the user comprises receiving from the user, an indication of whether the user perceived the first audio test pattern as originating at the location.

8. The computer-implemented method of claim 1, further comprising:

selecting a second candidate audio profile that is representative of the plurality of candidate audio profiles included in a second cluster of the plurality of clusters; and generating a second plurality of audio test patterns, wherein each audio test pattern of the second plurality of audio test patterns is rendered based on the second candidate audio profile, wherein receiving at least one response of the user based on the second plurality of audio test patterns further comprises receiving, from the user, a user preference ranking between the first candidate audio profile and the second candidate audio profile.

9. The computer-implemented method of claim 1, further comprising:

receiving, from the user, an indication of a rejection of the first candidate audio profile;

excluding, from the plurality of vector representations, a vector representation corresponding to the first candidate audio profile;

re-clustering the plurality of vector representations into an updated plurality of clusters;

selecting a second candidate audio profile that is representative of the plurality of candidate audio profiles included in a second cluster of the updated plurality of clusters;

presenting, to the user, a plurality of additional audio test patterns, wherein each audio test pattern of the plurality of additional audio test patterns is rendered based on the second candidate audio profile;

receiving, from the user, at least one additional response based on the plurality of additional audio test patterns; and determining an audio profile for the audio output device based on the at least one additional response of the user.

10. One or more non-transitory computer readable media storing instructions that, when executed by one or more processors, cause the one or more processors to perform the steps of:

generating a plurality of vector representations, wherein each vector representation of the plurality of vector representations is based on a candidate audio profile of a plurality of candidate audio profiles;

clustering the plurality of vector representations into a plurality of clusters;

selecting a first candidate audio profile that is representative of the plurality of candidate audio profiles included in a first cluster of the plurality of clusters;

presenting, to a user, a plurality of audio test patterns, wherein each audio test pattern is rendered based on the first candidate audio profile;

receiving, from the user, at least one response based on the plurality of audio test patterns; and determining an audio profile for an audio output device based on the at least one response of the user.

11. The one or more non-transitory computer readable media of claim 10, wherein the step of generating the plurality of vector representations comprises the step of generating a vector representation of the first candidate audio profile by aggregating two or more left ear measurements of the first candidate audio profile and aggregating two or more right ear measurements of the first candidate audio profile.

12. The one or more non-transitory computer readable media of claim 10, wherein the step of generating the plurality of vector representations comprises the step of generating a vector representation for the first candidate audio profile based on a normalized logarithmic intensity of a frequency response of the first candidate audio profile for each frequency bin within a binned human-audible frequency range.

13. The one or more non-transitory computer readable media of claim 10, wherein the step of generating the plurality of vector representations further comprises the step of performing principal component analysis of the plurality of candidate audio profiles.

14. The one or more non-transitory computer readable media of claim 10, wherein the step of selecting the first candidate audio profile comprises the step of determining that the first candidate audio profile corresponds to a medoid vector of the first cluster.

15. The one or more non-transitory computer readable media of claim 10, wherein the step of presenting the plurality of audio test patterns comprises the steps of:

generating a location within a multidimensional space relative to a head of the user;

generating a visual representation of a sound source displayed at the location; and rendering a first audio test pattern originating at the location based on the first candidate audio profile.

16. The one or more non-transitory computer readable media of claim 15, wherein the step of receiving the at least one response of the user comprises the step of receiving from the user, an indication of whether the user perceived the first audio test pattern as originating at the location.

17. The one or more non-transitory computer readable media of claim 10, further comprising the steps of:

selecting a second candidate audio profile that is representative of the plurality of candidate audio profiles included in a second cluster of the plurality of clusters;

generating a second plurality of audio test patterns, wherein each audio test pattern of the second plurality of audio test patterns is rendered based on the second candidate audio profile; and receiving, from the user, a user preference ranking between the first candidate audio profile and the second candidate audio profile.

18. The one or more non-transitory computer readable media of claim 10, further comprising the steps of:

receiving, from the user, an indication of a rejection of the first candidate audio profile;

excluding, from the plurality of vector representations, a vector representation corresponding to the first candidate audio profile;

re-clustering the plurality of vector representations into an updated plurality of clusters;

selecting a second candidate audio profile that is representative of the plurality of candidate audio profiles included in a second cluster of the updated plurality of clusters;

presenting, to the user, a plurality of additional audio test patterns, wherein each audio test pattern of the plurality of additional audio test patterns is rendered based on the second candidate audio profile;

receiving, from the user, at least one additional response based on the plurality of additional audio test patterns; and determining an audio profile for the audio output device based on the at least one additional response of the user.

19. A system comprising:

a memory storing instructions, and one or more processors that execute the instructions to perform steps comprising:

generating a plurality of vector representations, wherein each vector representation of the plurality of vector representations is based on a candidate audio profile of a plurality of candidate audio profiles;

clustering the plurality of vector representations into a plurality of clusters;

selecting a first candidate audio profile that is representative of the plurality of candidate audio profiles included in a first cluster of the plurality of clusters;

presenting, to a user, a plurality of audio test patterns, wherein each audio test pattern is rendered based on the first candidate audio profile;

receiving, from the user, at least one response based on the plurality of audio test patterns; and determining an audio profile for an audio output device based on the at least one response of the user.

20. The system of claim 19, further comprising the audio output device;

wherein:

the step of determining the audio profile further comprises the step of determining the audio profile for the audio output device based on a medoid vector of at least one cluster of the plurality of clusters; and the steps further comprise rendering spatial audio through the audio output device based on the audio profile determined for the audio output device.

* * * * *